United States Patent [19]
Lambert et al.

[11] 3,859,329
[45] Jan. 7, 1975

[54] PURIFICATION PROCESS

[75] Inventors: John Eric Lambert; Charles Henry Vasey, both of Stockton-on-Tees, England

[73] Assignee: Imperial Chemical Industries Limited, London, England

[22] Filed: Aug. 16, 1973

[21] Appl. No.: 388,965

[30] Foreign Application Priority Data
Aug. 18, 1972 Great Britain................... 38626/72

[52] U.S. Cl..... 260/465.8 R, 260/465.2, 260/583 K
[51] Int. Cl................. C07c 121/10, C07c 121/26
[58] Field of Search.......... 260/465.2, 465.8 R, 464, 260/583 K

[56] References Cited
UNITED STATES PATENTS
3,758,545  9/1973  Pounder et al............... 260/465.8 R FOREIGN PATENTS OR APPLICATIONS
1,174,601  12/1969  Great Britain............... 260/465.8 R
928,406  5/1955  Germany...................... 260/465.8 R Primary Examiner—Joseph P. Brust
Attorney, Agent, or Firm—Cushman, Darby & Cushman

[57] ABSTRACT

Adiponitrile containing 2-cyanocyclopenten-(1)-ylamine as impurity is treated with aqueous formaldehyde and, without prior separation of formaldehyde or its reaction products, the total mixture is either distilled to recover purified adiponitrile or is hydrogenated to hexamethylene diamine and the latter recovered by distillation.

11 Claims, No Drawings

PURIFICATION PROCESS

This invention relates to the purification of crude adiponitrile and to a process for the conversion of crude adiponitrile to hexamethylene diamine.

Hexamethylene diamine, which is normally made by the hydrogenation of adiponitrile, is an important intermediate in the manufacture of polyamides by polycondensation with dicarboxylic acids, for example with adipic acid to give polyhexamethylene adipamide, also known as nylon 6,6. Such polyamides are suitable for use in mouldings and in many instances for melt spinning into synthetic fibres. For such uses, and especially for fibre use, it is important that the intermediates used in the polycondensation reaction are as pure as possible otherwise the physical properties of the ultimate product, especially when this is a fibre, may be adversely affected. In the case of hexamethylene diamine a particularly troublesome impurity is aminomethylcyclopentylamine which is very difficult to separate completely from it by the conventional method of fractional distillation because of the closeness of the boiling points of the two substances.

Aminomethylcyclopentylamine in hexamethylene diamine arises largely by reduction of 2-cyanocyclopenten-(1)-ylamine present as an impurity in adiponitrile when that adiponitrile is hydrogenated to give hexamethylene diamine. 2-Cyanocyclopenten-(1)-ylamine is likewise difficult to remove from adiponitrile, again because of the closeness of the boiling points of the two substances. It is, however, preferred to remove as much 2-cyanocyclopenten-(1)-ylamine from the adiponitrile as possible before it is passed forward for hydrogenation to hexamethylene diamine.

Various methods of separating 2-cyanocyclopenten-(1)-ylamine from adiponitrile have been proposed. In particular it has been proposed to treat the crude adiponitrile with dilute aqueous formaldehyde solution, to separate the aqueous and adiponitrile portions and to wash the latter with water. It has also been proposed to treat crude adiponitrile with paraformaldehyde in the absence of water. The latter process is said to give a product which is suitable for direct conversion to hexamethylene diamine since the 2-cyanocyclopenten-(1)-ylamine is said to be thereby converted to another substance which need not be separated before the hydrogenation of the adiponitrile.

We have now found, surprisingly, that if crude adiponitrile containing 2-cyanocyclopenten-(1)-ylamine is treated with aqueous formaldehyde the treated product may, without first separating the formaldehyde or its reaction products, be fractionally distilled to give adiponitrile of improved purity. The treated product is also suitable for direct hydrogenation to hexamethylene diamine which, on separation by fractional distillation, is of improved purity compared with that obtained by hydrogenation of untreated crude adiponitrile.

Accordingly our invention provides a process for treating crude adiponitrile containing 2-cyanocyclopenten-(1)-ylamine which comprises adding aqueous formaldehyde thereto, maintaining the mixture until the content of 2-cyanocyclopenten-(1)-ylamine is reduced and, without first separating the formaldehyde or its reaction products, either fractionally distilling the mixture to obtain adiponitrile of improved purity, or hydrogenating the treated product in presence of a hydrogenation catalyst and fractionally distilling to obtain hexamethylene diamine of improved purity.

Since 2-cyanocyclopenten-(1)-ylamine is a conversion product obtained on heating adiponitrile it is liable to be present in crude adiponitrile whatever synthetic method is used to prepare that compound.

The process of our invention may be applied to crude adiponitrile as obtained directly from the synthetic process employed for its manufacture, for example the reaction of adipic acid with ammonia in the presence of a dehydrating catalyst. Such crude adiponitrile may contain, for example, 1 percent or more by weight of 2-cyanocyclopenten-(1)-ylamine. We prefer, however, to apply the process to a semi-refined adiponitrile which has already undergone a preliminary separation from impurities. Such a separation will consist of a distillation or a series of distillations for removal of both lower-boiling and higher-boiling impurities than adiponitrile. The resulting semi-refined adiponitrile will still contain a proportion, for example 0.1 to 0.2 percent by weight, of 2-cyanocyclopenten-(1)-ylamine. A distilled adiponitrile of this kind will have had any water previously present in it removed, but our process does not require the adiponitrile feed to be free from water and is equally applicable to wet adiponitrile.

The aqueous formaldehyde used in the process of our invention is conveniently commercial formaldehyde of approximately 40 percent strength by weight. More dilute aqueous formaldehyde may be used, but there is normally little point in diluting the commercial formaldehyde with water since the additional water will subsequently have to be removed by distillation.

The treatment with the aqueous formaldehyde is continued until the content of 2-cyanocyclopenten-(1)-ylamine in the adiponitrile is significantly reduced. This will normally be until the content is less than 0.025 percent by weight and preferably less than 0.015 percent by weight.

The content of 2-cyanocyclopenten-(1)-ylamine may be measured by the usual methods of gas-liquid chromatography. The treatment is normally effected at a moderately elevated temperature, for example at a temperature between 35°C and 200°C, preferably between 50°C and 100°C. The time of treatment normally varies between a few minutes (for example 15 minutes) and several days (for example 5 days). The treatment may be carried out under pressure if desired, but normally this is not necessary unless a temperature above 100°C is chosen.

The amount of formaldehyde used depends, of course, on the proportion of 2-cyanocyclopenten-(1)-ylamine in the crude adiponitrile. Normally we prefer to use between 0.2 and 2 parts by weight of formaldehyde (calculated as 100 percent) for each part by weight of 2-cyanocyclopenten-(1)-ylamine present.

After the treatment with formaldehyde the total reaction mixture may be distilled, preferably under reduced pressure, to recover adiponitrile. In such distillation the water in the aqueous formaldehyde and any present in the original adiponitrile is removed as a fore-run, and the reaction product of the formaldehyde and 2-cyanocyclopenten-(1)-ylamine remains behind us as a high-boiling residue. The distilled adiponitrile has a low content of 2-cyanocyclopenten-(1)-ylamine and is suitable for hydrogenation in presence of a hydrogenation catalyst to hexamethylene diamine by methods already known to the art.

Alternatively, however, the aqueous formaldehyde treated reaction mixture, without prior distillation, may be hydrogenated in presence of a hydrogenation catalyst to convert the adiponitrile therein to hexamethylene diamine, and the hexamethylene diamine separated by fractional distillation, preferably under reduced pressure. The distilled hexamethylene diamine has a low content of aminomethylcyclopentylamine and is suitable for use in the manufacture of polyamides.

The methods of hydrogenating adiponitrile to hexamethylene diamine and the hydrogenation catalysts therefor are those already known to the art. Particularly suitable catalysts are iron, cobalt or nickel catalysts, and they may be either partially or completely reduced to metallic form, for example, by prior treatment with hydrogen. The catalysts may be finely divided (for example of the Raney type), or granular, or may be supported for example on alumina, silica, carbon, pumice or other suitable support. In many cases, in order to prevent the formation of by-products, the hydrogenation is effected in the presence of an excess of ammonia. The hydrogenation is normally effected at temperatures within the range 80° to 200°C under pressures of up to 500 atmospheres. Particularly suitable catalysts are granular cobalt oxide catalysts which have been pre-activated by heating in an atmosphere of hydrogen, especially those whose activity has been promoted by the incorporation therein of a proportion of silica, as described, for example, in British Pat. No. 759,426.

After removing excess hydrogen and any ammonia, and if necessary separating from catalyst, the hexamethylene diamine is separated by fractional distillation, or a series of fractional distillations, preferably under reduced pressure.

In such distillation the water in the aqueous formaldehyde and any present in the original adiponitrile is removed as a fore-run, and the reaction product of the formaldehyde and 2-cyanocyclopenten-(1)-ylamine, or its conversion product on hydrogenation, remains behind as a high-boiling residue.

The invention is illustrated but not limited by the following Examples in which the parts and percentages are by weight.

EXAMPLE 1

Aqueous formaldehyde solution (2.5 parts of 40 percent, equivalent to 1 part at 100 percent) was added to a mixture of 100 parts of pure adiponitrile, saturated with 6 percent of water, and 1 part of 2-cyanocyclopenten-(1)-ylamine, and the resulting mixture heated at 90°C for 2 hours. The proportion of 2-cyanocyclopenten-(1)-ylamine then present, as estimated by gas-liquid chromatographic analysis, was 0.01 percent.

The resulting adiponitrile yields hexamethylene diamine on hydrogenation in presence of ammonia and a reduced cobalt oxide catalyst.

EXAMPLE 2

Aqueous formaldehyde solution (1.8 parts of 40 percent equivalent to 0.72 parts at 100 percent) was added to a semi-refined adiponitrile (400 parts) containing 0.15% of 2-cyanocyclopenten-(1)-ylamine, and the mixture heated for 20 hours at 90°C. At this stage only a trace of 2-cyanocyclopenten-(1)-ylamine was detectable by gas-liquid chromatographic analysis. A further addition of 0.4 parts of 40 percent aqueous formaldehyde (equivalent to 0.16 parts at 100 percent) was made and the mixture heated at 90°C for a further 3½130 days. No trace of 2-cyanocyclopenten-(1)-ylamine could then be detected.

The resulting mixture was distilled at a pressure of 40 mm. of mercury. A small fores fraction containing water and low-boiling material was rejected, and adiponitrile (340 parts) distilled at 180°/40 mm. and was found to be free of 2-cyanocyclopenten-(1)-ylamine.

EXAMPLE 3

Aqueous formaldehyde (2 parts of 40 percent, equivalent to 0.8 parts at 100 percent) was added to crude adiponitrile (100 parts) containing 0.6 parts of 2-cyanocyclopenten-(1)-ylamine, and the mixture heated for 20 hours at 90°C. The level of 2-cyanocyclopenten-(1)-ylamine fell to 0.02 parts. The resulting mixture was distilled at a pressure of 40 mm. of mercury. A small fores fraction containing water and low-boiling material was rejected, and adiponitrile (85 parts) distilled at 180°/40 mm. The distillate was virtually free of 2-cyanocyclopenten-(1)-ylamine.

We claim:

1. A process for treating crude adiponitrile containing 2-cyanocyclopenten-(1)-ylamine in amounts arising during the manufacture of crude adiponitrile which comprises adding aqueous formaldehyde thereto in the amount of 0.2 to 2 parts by weight (calculated as 100%) for each part by weight of 2-cyanocyclopenten-(1)-ylamine present in the crude adiponitrile, maintaining the mixture within the temperature range 35° to 200°C until the content of 2-cyanocyclopenten-(1)-ylamine is reduced to below 0.025% by weight and, without first separating the formaldehyde or its reaction products, fractionally distilling the mixture to obtain adiponitrile of improved purity.

2. A process as claimed in claim 1 in which the aqueous formaldehyde is commercial formaldehyde of approximately 40 percent strength by weight.

3. A process as claimed in claim 1 in which the crude adiponitrile used has already undergone a preliminary separation from impurities.

4. A process as claimed in claim 1 in which the treatment is effected at a temperature within the range 50° to 100°C.

5. A process as claimed in claim 1 in which the mixture resulting from the formaldehyde treatment is fractionally distilled to give a fore-run containing water and a main fraction consisting of purified adiponitrile, and to leave a residue containing the reaction product of formaldehyde and 2-cyanocyclopenten-(1)-ylamine.

6. In a process for the manufacture of hexamethylene diamine from crude adiponitrile containing 2-cyanocyclopenten-(1)-ylamine in amounts arising during the manufacture of crude adiponitrile, in which process adiponitrile is hydrogenated in the presence of a hydrogenation catalyst and the resulting hexamethylene diamine is purified by fractional distillation, the improvement which comprises adding to the crude adiponitrile aqueous formaldehyde in the amount of 0.2 to 2 parts by weight (calculated as 100 percent) for each part by weight of 2-cyanocyclopenten-(1)-ylamine present in the crude adiponitrile, maintaining the mixture within the temperature range 35° to 200°C until the content of 2-cycanocyclopenten-(1)-ylamine is reduced to below 0.025 percent by weight, and then hydrogenating the so-treated adiponitrile without first separating the formaldehyde or its reaction products.

7. A process as claimed in claim 6 in which the aqueous formaldehyde is commercial formaldehyde of approximately 40 percent strength by weight.

8. A process as claimed in claim 6 in which the crude adiponitrile used has already undergone a preliminary separation from impurities.

9. A process as claimed in claim 6 in which the treatment is effected at a temperature within the range 50° to 100°C.

10. A process as claimed in claim 6 in which the mixture resulting from the formaldehyde treatment is hydrogenated in the presence of an iron, cobalt or nickel catalyst, and hexamethylene diamine is separated from the hydrogenation product by fractional distillation.

11. A process as claimed in claim 10 in which the hydrogenation is effected in the presence of ammonia.

* * * * *